Patented May 6, 1941

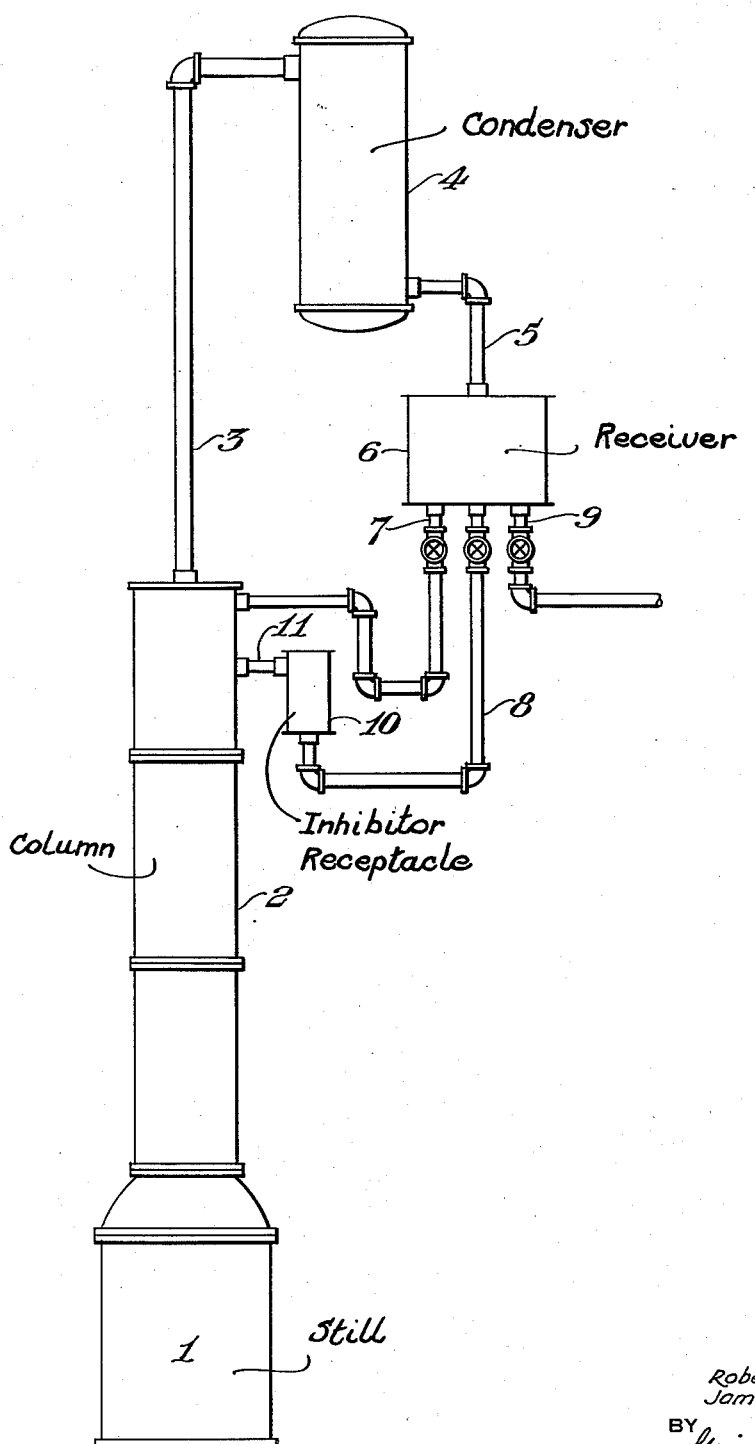

2,240,764

UNITED STATES PATENT OFFICE 2,240,764

DISTILLATION OF VINYL AROMATIC COMPOUNDS

Robert R. Dreisbach and James E. Pierce, Midland, Mich., assignors to The Dow Chemical Company, Midland, Mich., a corporation of Michigan Application March 1, 1939, Serial No. 259,190

9 Claims. (Cl. 202—57)

This invention concerns an improved method of distilling certain polymerizable organic compounds, particularly styrene and its homologues and analogues, whereby the usual loss of such compounds by polymerization during distillation may be reduced. This application is a continuation-in-part of our co-pending application Serial No. 146,518, filed June 4, 1937.

In the manufacture of styrene and other vinyl aromatic compounds, difficulty is usually encountered in purifying the products by distillation due to their tendency to polymerize quite rapidly at elevated temperatures. In order to overcome this difficulty, Ostromislensky et al. in U. S. Patents Nos. 1,550,323 and 1,550,324 have proposed adding to styrene, prior to distilling the same, certain relatively high boiling agents such as quinone, trinitrobenzene, etc., which have the property of inhibiting polymerization of styrene. We have tested this method and found that although it reduces to some extent the amount of polymerization which normally occurs during a distillation, considerable polymerization does occur even when operating in such manner.

The problem of separating styrene from ethyl benzene by distillation is of particular importance, since a mixture of said compounds is obtained by the pyrolysis of ethyl benzene, but the proximity of the boiling points of the two compounds coupled with the tendency of the styrene to polymerize when heated, has rendered the problem of effecting such separation a difficult one. Stanley, in Chem. Ind. 57, 93, (1938), has concisely acknowledged this problem by stating that "the dehydrohalogenation of ethyl benzene invariably yields a mixture of styrene and unchanged ethyl benzene from which pure styrene cannot be recovered by the usual fractionation methods."

In studying styrene and other polymerizable vinyl aromatic compounds, we have discovered that the polymerization which occurs during distillation of the same takes place not only in the still pot but also to large extent in the distilling column. We have further found that the polymerization which normally occurs during distillation of such compound may be reduced greatly and sometimes be entirely prevented by contracting both the distilling liquid and the vapors in the still column with an agent effective in inhibiting the polymerization. We have also found that by such use of an inhibitor in the distilling column, a mixture of styrene and ethyl benzene may readily be fractionated to separate the styrene in substantially pure form and in excellent yield. The invention, accordingly, consists in the method hereinafter fully described and particularly pointed out in the claims.

The annexed drawing illustrates one of the various forms of apparatus which may be employed in practicing the invention. In the drawing, numeral 1 indicates a still provided with a distilling column 2. Vapor line 3 leads from the top of column 2 to a condenser 4, from which a conduit 5 for the condensate connects with a receiver 6. Receiver 6 is elevated above the top of column 2 to permit gravity flow of liquid from the receiver to the column and is provided with three valved outlet pipes 7, 8 and 9 which serve to divide the flow of condensate. Pipe 7 leads to the top of column 2 for the return of a portion of the condensate thereto. Pipe 8, also adapted for return of condensate, is connected to the bottom of a receptacle 10 which contains a body of a solid polymerization inhibitor, while an overflow pipe 11 near the top of receptacle 10 connects with the top of column 2 below pipe 7. Pipe 9 is used to remove condensate from the system. The relative flow of condensate in pipes 7, 8 and 9 is regulated by the valves.

In the operation of such apparatus, still 1 is charged with a vaporizable vinyl aromatic compound, which preferably though not necessarily contains an agent effective in inhibiting its polymerization. Receptacle 10 is charged with a granular or comminuted solid agent also effective in inhibiting polymerization of the compound, such agent having the additional property of being insoluble or only slightly soluble in said compound. Complete insolubility is not necessary and may even be undesirable. It is sufficient that a substantial portion of the agent remain solid and undissolved during operation of the still.

The distillation is carried out in conventional manner, a portion of the distillate being returned to the column through U tube 8, receptacle 10, and pipe 11. The liquid thus returned to the column carries with it, in dissolved or suspended form, a small proportion of inhibiting agent from receptacle 10, with the result that, once the distillation is started, the vapors and liquid in column 2 are maintained in contact with an agent effective in preventing polymerization of the same. If desired, additional distillate may also be returned to column 2 via U tube 7 for purpose of reflux. The inhibiting agent carried into the column during the distillation tends to accumulate in still 1; hence the liquid in the still becomes inhibited against polymerization shortly after the distillation is started, even though no inhibitor be added to it prior to the distillation. The proportion of inhibitor in column 2 at any one time may be controlled by regulating the rate of liquor flow through valved U tube 8 and also by choosing an inhibitor of suitable solubility in the liquid being distilled. The distillation is preferably carried out under vacuum, although it may in some instances be carried out at atmospheric pressure or even somewhat above.

The method just described is applicable in distilling other polymerizable vinyl aromatic compounds, such as 4-chloro-styrene, 4-ethyl-styrene, ethyl-vinyl-benzene, divinyl-benzene, vinyl naphthalene, etc. It may, of course, be applied in separating any such vinyl aromatic compound from organic impurities therein which have distilling temperatures different from that of the compound. For instance, it may be applied in separating styrene from its mixture with benzene, toluene, ethyl-benzene, or mixtures of such compounds; in separating vinyl naphthalene from ethyl naphthalene; in separating 4-chloro-styrene from 4-chloro-1-ethyl-benzene; etc.

A number of organic and inorganic substances may be employed as inhibiting agents in the process, e. g. sulphur, selenium, arsenic trisulphide, arsenic pentasulphide, aluminum sulphide, copper nitrate, copper salicylate, catechol, tertiary-butyl-catechol, dinitro-benzene, trinitrobenzene, etc. All of said substances are effective inhibitors against the polymerization of compounds of the above-mentioned type. Certain of them, e. g. arsenic pentatsulphide and antimony pentasulphide, are substantially insoluble in styrene, while others, such as tertiary-butyl-catechol, tertiary-butyl-resorcinol, and the nitrobenzenes are fairly soluble.

The following examples demonstrate some of the advantages of the invention and describe certain ways in which it has been applied, but they are not to be construed as limiting the invention.

Example 1

The following table describes the results obtained in a number of experiments on distilling styrene. All of the distillations were carried out at 100 millimeters absolute pressure, using apparatus similar to that illustrated in the accompanying drawing. The styrene charged into the still contained from 1 to 3 per cent by weight of sulphur. In the first experiment styrene was distilled without introduction of any inhibitor into the still column, for comparison with the other experiments, wherein the inhibitor named in the table was introduced into the column during the distillation along with the refluxing liquid, as hereinbefore described. The table gives the weight of styrene recovered in the distillation, and the per cent recovery of styrene in each instance.

Table

| Styrene charged, pounds | Inhibitor in column | Styrene recovered, pounds | Percent recovery |
|---|---|---|---|
| 265 | None | 220 | 83 |
| 271 | Sulphur | 262 | 97 |
| 46 | do | 46 | 100 |
| 516 | Tertiary-butyl catechol | 500 | 97 |

Example 2

A pyrolyzed ethyl benzene mixture containing approximately 35 per cent by weight of styrene, 64.5 per cent of ethyl benzene, and minor proportions of other organic compounds, e. g. benzene, etc., was fractionally distilled in continuous manner at an absolute pressure of approximately 50 millimeters of mercury while returning a portion of the distillate through a bed of sulphur to the top of the distilling column. The distillate thus returned for purpose of reflux carried with it about 0.3 per cent by weight of sulphur so that the latter was distributed within the column. The distillate not returned for purpose of reflux was collected as usual. It represented approximately 60 per cent by weight of all material charged to the still and consisted of 98.4 per cent ethyl benzene and 1.4 per cent styrene. The residue from the distillation represented 40 per cent of the material charged to the still and consisted of 89 per cent by weight styrene, 8.5 per cent ethyl benzene, about 0.9 per cent sulphur and the remainder organic impurities. This residue was then fractionally distilled at absolute pressures which varied between 30 and 60 millimeters of mercury, while returning a portion of the distillate through a bed of sulphur to the top of the distilling column as in the first distillation. In this second distillation, 30.4 per cent of the styrene in the material charged was collected as the pure compound, 46.4 per cent was collected as 98 per cent pure styrene, and 20.35 per cent was collected as styrene of 71 per cent purity.

The invention may be practiced in other ways than that hereinbefore described. For instance, a substantially insoluble inhibiting agent, such as arsenic pentasulphide or antimony pentasulphide, may be employed alone or on a carrier material such as pumice, broken brick, etc., as packing in the still column, thereby avoiding necessity for circulating the reflux liquid through a body of an inhibiting agent prior to return to the column. Also, a liquid inhibiting agent such as nitrobenzene having a boiling point above that of the vinyl aromatic compound being distilled, or a solution of a solid inhibiting agent of such boiling point in an inert solvent, e. g. a solution of tertiary-butyl-catechol, tertiary-butyl-resorcinol, or tri-nitro-benzene in diethylbenzene, tetrahydronaphthalene, or other suitable solvent, may be introduced gradually to the distilling column from an external source during distillation of a vinyl aromatic compound in accordance with otherwise conventional procedure.

Accordingly, the invention comprises distilling a polymerizable organic compound in such manner that the vapors are contacted in the distilling column with an agent effective in inhibiting the polymerization, but it is not limited to any particular procedure for introducing such agent to the column. It is merely necessary that during operation the inhibitor be distributed throughout the major portion of the column.

The expression "inhibiting agent" as employed herein refers to an agent effective in inhibiting polymerization of a vinyl aromatic compound such as styrene.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In the distillation of a polymerizable vinyl aromatic compound, the step which consists in contacting said compound while in the distilling column with an agent effective in inhibiting polymerization thereof, the inhibitor being introduced during the distillation at a point near the top of the distilling column and being distributed through the major portion of the column.

2. In a method for the purification of a polymerizable vinyl aromatic compound by distillation, the steps which consist in contacting the compound in the still and in the distilling column with an agent effective in inhibiting polymerization thereof, the inhibiting agent being introduced during the distillation at a point near the top of the distilling column and being distributed through the major portion of the column.

3. In a method for the purification of a polymerizable vinyl aromatic compound by distillation, the step of continuously returning to the still column at a point near its top a portion of the distillate together with an agent effective in inhibiting polymerization of the vinyl aromatic compound.

4. In the distillation of a polymerizable vinyl aromatic compound, the step of distilling the same through a distilling column containing a packing comprising a substantially insoluble agent effective in inhibiting polymerization of said vinyl aromatic compound, the packing extending upward in the column so that the distilling vapors must pass through it.

5. In the fractional distillation of styrene, the step of contacting styrene in the still column with an agent effective in inhibiting its polymerization, said inhibiting agent being introduced during the distillation at a point near the top of the distilling column and being distributed through the major portion of the column.

6. In a method wherein a solution comprising styrene and ethyl benzene is fractionally distilled to separate the styrene, the step of contacting the distilling mixture in the still column with an agent effective in inhibiting polymerization of the styrene, said inhibiting agent being introduced during the distillation at a point near the top of the distilling column and being distributed through the major portion of the column.

7. In a method wherein a solution comprising styrene and ethyl benzene is fractionally distilled to separate the styrene therefrom, the step of returning a portion of the distillate through a body of a solid and sparingly soluble agent effective in inhibiting polymerization of the styrene, whereby said agent is continuously introduced into and distributed through the greater portion of the column.

8. In the fractional distillation of styrene, the step of contacting the latter with sulphur while in the distilling column, the sulphur being introduced during the distillation at a point near the top of the distilling column and being distributed through the major portion of the column.

9. In a method wherein a solution comprising styrene and ethyl benzene is fractionally distilled to separate the styrene therefrom, the step of returning a portion of the distillate through a body of sulphur to the distilling column, whereby sulphur is continuously introduced into and distributed through the major portion of the column.

ROBERT R. DREISBACH.
JAMES E. PIERCE.